(No Model.)

F. G. KOLLENBERG.
NUT LOCK.

No. 575,358. Patented Jan. 19, 1897.

Witnesses
John Enders Jr.
K. A. Mau

Inventor
Frederick G. Kollenberg
By John Wedderburn
his Attorney

UNITED STATES PATENT OFFICE.

FREDERICK G. KOLLENBERG, OF OWENSBOROUGH, KENTUCKY, ASSIGNOR OF ONE-HALF TO JAMES H. HICKMAN, OF SAME PLACE.

NUT-LOCK.

SPECIFICATION forming part of Letters Patent No. 575,358, dated January 19, 1897.

Application filed May 22, 1896. Serial No. 592,674. (No model.)

*To all whom it may concern:*

Be it known that I, FREDERICK G. KOLLENBERG, a citizen of the United States, residing at Owensborough, in the county of Daviess and State of Kentucky, have invented certain new and useful Improvements in Nuts for Bolts; and I do hereby declare the following to be a full, clear, and exact description of the invention, such as will enable others skilled in the art to which it appertains to make and use the same.

My invention relates to improvements in nut and bolt locks, the object of the same being to provide a nut adapted to be used on bolts in any kind of machinery which cannot be removed by jarring, reversing of the parts, or, in fact, in any way, unless it is intended that the same shall be removed.

The invention consists of a bolt having screw-threads upon its outer end and a longitudinal notch in the threaded portion thereof forming a shoulder, a nut adapted to be screwed upon said bolt, having a recess in its inner surface, an unattached strip of metal fitting within said recess, a spring separated from said strip for normally urging the latter outwardly, and a screw for forcing and positively holding said strip inwardly in engagement with the shoulder formed by the recess in said bolt.

The invention is clearly illustrated in the accompanying drawings, in which—

Figure 1:
Figure 2:
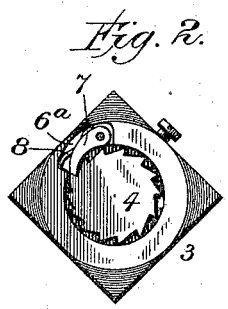
Figure 3:
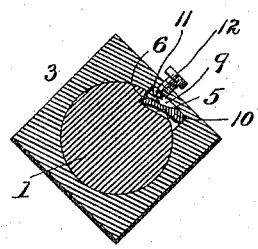
Figure 4:
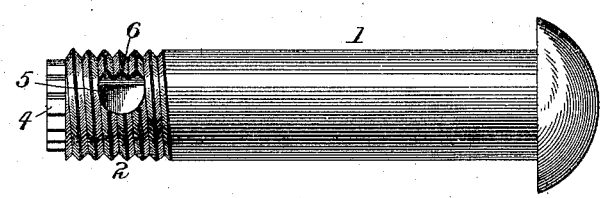

Figure 1 is a side elevation of my bolt and nut. Fig. 2 is an end view of the same. Fig. 3 is a cross-section through the same, the said section being taken through the longitudinal notch in said bolt and the parts coacting therewith. Fig. 4 is a detail view of the bolt.

Like reference-numerals indicate like parts in the different views.

The bolt 1 is formed with the usual threaded portion 2, upon which the nut 3 is adapted to be screwed, and has a ratchet 4 upon its outer end, which is formed integral therewith. The said bolt 1 is further provided with a longitudinal notch 5, forming a shoulder 6 thereon. The nut 3 is recessed, as shown at 6ª, upon its outer end, and in this recess is pivoted to the end of the nut a pawl 7, which is normally urged inward by the spring 8, as clearly shown. The said nut 3 is provided with a second recess 9 along its inner surface, in which fits a strip of metal 10, which is held normally inward beyond the inner surface of the nut 3 by the engagement of the spring 11 with the under side thereof, or positively by a screw 12, extending through the side of the nut 3 and engaging the under side of said strip. A covering-plate 13 may be pivotally secured to the outer end of the nut 3, if desired.

My improved nut-lock operates as follows: When the nut 3 is screwed upon the end of the bolt 1, the pawl 7 engages one of the teeth of the ratchet 4 on said bolt and prevents the unscrewing of the nut. At the same time the metallic strip 10 is forced inwardly into engagement with the shoulder 6, acting as a further means to prevent the unscrewing of the nut 3. In using my nut on the wheel-spindle of wagons I may dispense with the shoulder 6 on the bolt 1 and the projecting piece 10 on the inside of the nut 3 and utilize merely the pawl 7 and the ratchet 4. In securing fish-plates and bolts on railroad-bridges, however, I find it more advantageous to employ the longitudinal shoulder 6 and the spring-actuated strip 10. In this case the nut 3 is permanently secured upon the end of the bolt. If it is desired, however, at any time to remove the nut from the bolt, the screw 12 may be taken out of the strip 10, permitting a reverse movement to be given to the nut 3.

Having now described my invention, what I claim as new, and desire to secure by Letters Patent, is—

The combination with a bolt having screw-threads upon its outer end, and a longitudinal recess in the threaded portion thereof forming a shoulder, of a nut adapted to be screwed upon said bolt, having a recess in its inner surface, an unattached strip of metal fitting within said recess, a spring separate from said strip for normally urging the latter inwardly and a screw for forcing and positively holding said strip inwardly in engagement with the shoulder formed by the recess in said bolt, substantially as and for the purpose described.

In testimony whereof I have signed this specification in the presence of two subscribing witnesses.

FREDERICK G. KOLLENBERG.

Witnesses:
 PETER HUGGER, Jr.,
 F. B. RANTON.